US011308722B2

(12) United States Patent
Weyers et al.

(10) Patent No.: US 11,308,722 B2
(45) Date of Patent: Apr. 19, 2022

(54) METHOD AND SYSTEM FOR DETERMINING AN ACTIVITY OF AN OCCUPANT OF A VEHICLE

(71) Applicant: Aptiv Technologies Limited, St. Michael (BB)

(72) Inventors: Patrick Weyers, Dortmund (DE); Alexander Barth, Wermelskirchen (DE); David Schiebener, Mettmann (DE)

(73) Assignee: Aptiv Technologies Limited, St. Michael (BB)

( * ) Notice: Subject to any disclaimer, the term of this patent is extended or adjusted under 35 U.S.C. 154(b) by 46 days.

(21) Appl. No.: 17/006,652

(22) Filed: Aug. 28, 2020

(65) Prior Publication Data
US 2021/0081689 A1    Mar. 18, 2021

(30) Foreign Application Priority Data

Sep. 17, 2019    (EP) .................................... 19197820

(51) Int. Cl.
*G06K 9/00*    (2022.01)
*G06K 9/62*    (2022.01)
(Continued)

(52) U.S. Cl.
CPC ............ *G06V 20/597* (2022.01); *B60W 40/09* (2013.01); *G06K 9/6269* (2013.01); *G06N 3/02* (2013.01);
(Continued)

(58) Field of Classification Search
CPC . G06K 9/00845; G06K 9/6269; B60W 40/09; B60W 2540/01; B60W 2540/229; G06N 3/02
See application file for complete search history.

(56) References Cited

U.S. PATENT DOCUMENTS 7,483,866 B2    1/2009  Luo
10,296,102 B1 *  5/2019  Misra ................... G06K 9/2054
(Continued)

OTHER PUBLICATIONS

Wikipedia, "Digital Photography" [online], 2021, downloaded Dec. 8, 2021 from < https://en.wikipedia.org/wiki/Digital_photography >, 16 pages (Year: 2021).*
(Continued)

*Primary Examiner* — David F Dunphy
(74) *Attorney, Agent, or Firm* — Sawtooth Patent Group PLLC (57) ABSTRACT

A computer implemented method for determining an activity of an occupant of a vehicle comprises the following steps carried out by computer hardware components: capturing sensor data of the occupant using at least one sensor; determining respective two-dimensional or three-dimensional coordinates for a plurality of pre-determined portions of the body of the occupant based on the sensor data; determining at least one portion of the sensor data showing a pre-determined body part of the occupant based on the sensor data and the two-dimensional or three-dimensional coordinates; and determining the activity of the occupant based on the two-dimensional or three-dimensional coordinates and the at least one portion of the sensor data.

20 Claims, 10 Drawing Sheets

(51) Int. Cl.
*B60W 40/09* (2012.01)
*G06N 3/02* (2006.01)
*G06V 20/59* (2022.01)

(52) U.S. Cl.
CPC ... *B60W 2540/01* (2020.02); *B60W 2540/229* (2020.02)

(56) References Cited

U.S. PATENT DOCUMENTS

| | | | |
|---|---|---|---|
| 10,322,728 | B1 | 6/2019 | Porikli et al. |
| 11,010,626 | B2 | 5/2021 | Barth et al. |
| 2002/0059022 | A1 | 5/2002 | Breed et al. |
| 2004/0220705 | A1 | 11/2004 | Basir et al. |
| 2007/0055428 | A1 | 3/2007 | Kong et al. |
| 2013/0204457 | A1 | 8/2013 | King et al. |
| 2018/0025240 | A1 | 1/2018 | Klement et al. |
| 2018/0300553 | A1 | 10/2018 | Khosla et al. |
| 2019/0019068 | A1 | 1/2019 | Zhu et al. |
| 2019/0171892 | A1 | 6/2019 | Alexander et al. |
| 2019/0213406 | A1 | 7/2019 | Porikli et al. |
| 2020/0017124 | A1* | 1/2020 | Camhi ............ G06N 20/00 |
| 2021/0326614 | A1* | 10/2021 | Zhao ............ G06K 9/00261 |

OTHER PUBLICATIONS

"Corrected Notice of Allowance", U.S. Appl. No. 16/196,193, dated Apr. 21, 2021, 2 pages.
"Foreign Office Action", EP Application No. 17205093.2, dated Mar. 25, 2021, 6 pages.
"Notice of Allowance", U.S. Appl. No. 16/196,193, dated Apr. 8, 2021, 10 pages.
"Non-Final Office Action", Application Number. dated Nov. 6, 2020, 11 pages.
"Notice of Allowance", U.S. Appl. No. 16/196,193, dated Sep. 15, 2020, 12 Pages.
Coleca, et al., "Self-Organizing Maps for Hand and Full Body Tracking", Jun. 2014, pp. 174-184.
Droeschel, et al., "3D Body Pose Estimation Using an Adaptive Person Model for Articulated ICP", Dec. 2011, 12 pages.
Finelli, et al., "Real Time Head Pose Estimation with Random Regression Forests", Jun. 2011, pp. 617-624.
He, "Deep Residual Learning for Image Recognition", Dec. 10, 2015, 12 pages.
Kohsia, et al., "Driver's View and Vehicle Surround Estimation Using Omnidirectional Video Stream", Jul. 2003, pp. 444-449.
Krizhevsky, et al., "ImageNet Classification with Deep Convolutional Neural Networks", May 2017, 9 pages.
Le, et al., "Fully Automated Multi-label Image Annotation by Convolutional Neural Network and Adaptive Thresholding", Dec. 2016, 8 pages.
Murphy-Chutorian, et al., "Head Pose Estimation in Computer Vision: A Survey", Apr. 2009, pp. 607-626.
Redmon, et al., "YOLO9000: Better, Faster, Stronger", Jul. 2017, 9 pages.
Simonya, et al., "Very Deep Convolutional Networks for Large-Scale Image Recognition", Apr. 10, 2015, 14 pages.
Szegedy, et al., "Going Deeper with Convolutions", Sep. 17, 2014, 12 pages.
Wang, et al., "CNN-RNN: A Unified Framework for Multi-label Image Classification", Apr. 2016, 10 pages.
Xia, et al., "Human Detection Using Depth Information by Kinect", Jun. 2011, pp. 15-22.
Yan, et al., "Driving Posture Recognition by Convolutional Neural Networks", Mar. 2016, pp. 102-114.
Zeng, et al., "Microsoft Kinect Sensor and Its Effect", Feb. 2012, 8 pages.
"Extended European Search Report", EP Application No. 19197820.4, dated Mar. 20, 2020, 9 pages.
Behera, et al., "Context-driven Multi-stream LSTM (M-LSTM) for Recognizing Fine-Grained Activity of Drivers", Feb. 14, 2019, pp. 298-314, 18 pages.
Demirdjian, et al., "Driver Pose Estimation with 3D Time-of-Flight Sensor", Mar. 30, 2009, 8 pages.

* cited by examiner

METHOD AND SYSTEM FOR DETERMINING AN ACTIVITY OF AN OCCUPANT OF A VEHICLE

CROSS-REFERENCE TO RELATED APPLICATION

This application claims priority to European Patent Application Number 19197820.4, filed Sep. 17, 2019, the disclosure of which is hereby incorporated by reference in its entirety herein.

BACKGROUND

Technology advances of recent driver assistance systems are increasing the amount of automation in series production vehicles. The human driver can hand over the control of the vehicle to the car in certain circumstances and scenarios. In a situation where the car needs to return control to the driver, it is essential to assess the current state and activity of the driver in order to decide whether he is able to take control. Also for non-autonomous cars with advanced active safety functions it may be helpful to have knowledge of the current activity and awareness of the driver, so that in the case where the driver is not aware of a critical situation arising, the car can adapt a warning strategy to prevent accidents or even critical driving situations.

SUMMARY

The present disclosure provides a computer implemented method, a computer system, and a non-transitory computer readable medium according to the independent claims. Embodiments are given in the subclaims, the description and the drawings.

In one aspect, the present disclosure is directed at a computer implemented method for determining an activity of an occupant of a vehicle, the method comprising the following steps performed (in other words: carried out) by computer hardware components: capturing sensor data of the occupant using at least one sensor; determining respective two-dimensional or three-dimensional coordinates for a plurality of pre-determined portions of the body of the occupant based on the sensor data; determining at least one portion of the sensor data showing a pre-determined body part of the occupant based on the sensor data and the two-dimensional or three-dimensional coordinates; and determining the activity of the occupant based on the two-dimensional or three-dimensional coordinates and the at least one portion of the sensor data.

According to another aspect, the sensor data comprises an image (captured by an image sensor) or a plurality of images (captured by the image sensor), and further sensor data (captured by at least one further sensor), and the at least one portion of the sensor data comprises at least one portion of the image. The at least one portion of the image may be determined based on the further sensor data and/or the image and/or the two-dimensional or three-dimensional coordinates.

In other words, an activity of an occupant (driver or passenger) of a vehicle may be determined (or estimated) based on coordinates (in two or three dimensions) of pre-determined portions of the occupant's body and based on portions of an image showing relevant portions of the occupant's body, wherein the portions of the image may be determined based on the image itself or based on other sensor data different from the sensor that captured the image.

The image may be a conventional image, which may also be referred to as intensity image or 2D image. The image may be a grayscale image or a color image.

The further sensor may be a sensor which is different from the image sensor, or which provides sensor data which is different from a (conventional) image. For example, the further sensor may provide distance information (or depth information); for example, the further sensor may be a ToF (time of flight) camera, a radar sensor, a lidar sensor, an ultrasound sensor, or an infrared sensor.

The two- or three-dimensional coordinates may be provided in a coordinate system, for example a coordinate system with an origin defined by the further sensor, or a coordinate system with an origin defined by a pre-determined point of the vehicle.

The at least one portion of the image, which may be referred to as a crop, may include a portion of the image of any shape. For example, for a rectangular image, the at least one portion of the image may be rectangular or circular, or of any other shape. When more than one portion of the image is determined, the various portions may have the same shape or different shapes, and may have the same size or different sizes. A size of the portion may refer to the number of pixels of the portion of the image (for example, for a rectangular portion of the image, the size of the portion of the image may be given by the width and height (each in pixels) of the rectangular shape).

It has been found that using only the at least one portion of the image (instead of the entire image) may enhance the results of the activity determination. For example, when using a neural network for determining the activity, using only the at least one portion of the image may avoid an overfitting of a neural network (or another classifier) to non-relevant parts of the image.

According to another aspect, the image comprises a plurality of intensity pixels, each intensity pixel indicating an intensity of light of a pre-determined wavelength or wavelength range received at the respective intensity pixel, and the further sensor data comprises a plurality of distance pixels, each distance pixel indicates a distance between the further sensor and an object corresponding to the respective distance pixel.

Thus, the image provides a visual representation of what a human observer would visually observe, while the further sensor data comprises distance information. It has been found that combining the visual representation of the image with the distance information of the further sensor data provides reliable results of the action determination.

According to another aspect, the pre-determined body part of the occupant comprises one of the occupant's hands and/or the occupant's face and/or one of the occupant's shoulders. It has been found that using these body parts (in particular using one or two of the occupant's hands and/or the occupant's face) provides reliable results when determining the occupant's activity. However, it will be understood that any other body part may be used.

According to another aspect, the at least one portion of the image is determined based on the two-dimensional or three-dimensional coordinates.

In the various steps of the method, the sensor data of a present time and of previous times (for example of a present time step and of previous time steps) may be used. For example, a classifier that incorporates information from several timesteps, like a 3D convolutional network, a recurrent neural network, or an LSTM (long short-term memory) may be used to consider sensor data of previous time steps.

According to another aspect, a plurality of images and a plurality of further sensor data are captured, and the two-dimensional or three-dimensional coordinates are determined based on at least one of the plurality of images and the plurality of further sensor data.

For example, an image and further sensor data may be captured at a plurality of points in time (or time steps), and the two-dimensional or three-dimensional coordinates, the at least one portion of the image, and the activity may be determined for each of the points in time. It has been found that having a history of determined activity may enhance further processing, for example may enhance determining an action of the vehicle to take or not to take, compared to having a determined activity at a single point in time only.

According to another aspect, the activity is determined based on one or more neural networks. For example, neural networks may be used to determine feature vectors based on the at least one portion of the image. Further feature vectors may be determined based on the two-dimensional or three-dimensional coordinates. The feature vectors determined based on the at least one portion of the image and the further feature vector may be provided to a classifier that incorporates information from several timesteps, like a 3D convolutional network, a recurrent neural network or an LSTM (in other words: a neural network with a LSTM structure).

According to another aspect, the activity is determined based on a softmax method. A softmax function, which may also be referred to as softargmax or normalized exponential function, may be a function that takes as input a vector of real numbers, and normalizes it into a probability distribution consisting of probabilities proportional to the exponentials of the input numbers. Prior to applying softmax, some vector components may be negative, or greater than one, and may not sum to 1. After applying softmax, each component may be in the interval between 0 and 1, and the components may add up to 1, so that they can be interpreted as probabilities.

For example, the output of the classifier that incorporates information from several timesteps (for example 3D convolutional network, recurrent neural network or LSTM) may be provided to the softmax method, and the result of the softmax method may represent (or encode) the determined activity.

According to another aspect, determining the activity comprises classifying an action of a driver into one or more classes of a plurality of classes of actions. Classifying into a class may include indicating a probability that the action is in the respective class, and the classification may be provided as an identifier of an action, or as an array (or vector) of determined actions, if more than one action is identified.

According to another aspect, classifying comprises determining a probability vector, wherein each entry of the probability vector indicates a respective probability for each class of the plurality of classes of actions.

It will be understood that the probability may be expressed as a real number between 0 and 1 (or between 0% and 100%), but that any other representation may be possible, for example a fuzzy representation, for example with probability levels of "most probably not", "maybe not", "maybe", "most probably yes", or any other representation suitable for indicating a probability.

It has been found that providing a vector of probabilities enhances the further processing based on the determined activity, for example in situations where the activity determination provides a result that is not determined with high confidence. Providing the vector of probabilities may not only provide the most probable activity, but a probability for each possible activity.

According to another aspect, the plurality of classes of actions comprises one or more of the following actions: entering a car; leaving a car; inserting an object to a car; removing an object from a car; inserting a baby seat to a car; removing a baby seat from a car; inserting a child to a car; removing a child from a car; inserting a baby to a car; removing a baby from a car, buckling up a seat belt; unbuckling a seat belt; interacting with a phone; holding a phone; active control of a phone; typing on a phone; talking on a phone; interacting with an object; interacting with a book; interacting with a magazine; interacting with a laptop; interacting with a tablet; interacting with the steering wheel; smoking; eating; drinking; operation of the vehicle infotainment system; operation of vehicle controls.

In another aspect, the present disclosure is directed at a computer system, said computer system comprising a plurality of computer hardware components configured to carry out several or all steps of the computer implemented method described herein.

The computer system may comprise a plurality of computer hardware components (for example a processing unit, at least one memory unit and at least one non-transitory data storage). It will be understood that further computer hardware components may be provided and used for carrying out steps of the computer implemented method in the computer system. The non-transitory data storage and/or the memory unit may comprise a computer program for instructing the computer to perform several or all steps or aspects of the computer implemented method described herein, for example using the processing unit and the at least one memory unit.

According to another aspect, the computer system may further include the image sensor and the at least one further sensor. The at least one further sensor may include or may be a time of flight camera. The image sensor and the at least one further sensor may be provided as a combined sensor (for example, the image sensor and the at least one further sensor may share a common housing and/or processing components).

In another aspect, the present disclosure is directed at a non-transitory computer readable medium comprising instructions for carrying out several or all steps or aspects of the computer implemented method described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM), such as a flash memory; or the like. Furthermore, the computer readable medium may be configured as a data storage that is accessible via a data connection, such as an internet connection. The computer readable medium may, for example, be an online data repository or a cloud storage.

The present disclosure is also directed at a computer program for instructing a computer to perform several or all steps or aspects of the computer implemented method described herein.

BRIEF DESCRIPTION OF THE DRAWINGS

Exemplary embodiments and functions of the present disclosure are described herein in conjunction with the following drawings, showing schematically.

DETAILED DESCRIPTION

Technology advances of recent driver assistance systems are increasing the amount of automation in series production vehicles. The human driver can hand over the control of the vehicle to the car in certain circumstances and scenarios. For example, level 3 driver assistance functions relieve the driver of several driving tasks, letting him focus on other activities instead of driving.

However, today the driver is still responsible for the driving task. Even with higher levels of automation, the human driver will remain responsible for monitoring the vehicle and, if required, has to be able to take back the control of the vehicle in a reasonable time. Thus, the driver still acts as a fallback for critical situations. To allow the driver to focus on other activities and simultaneously use him as a fallback, proper knowledge of the driver state is required to warn or inform the driver efficiently if needed.

In a situation where the car needs to return control to the driver, it may be necessary to assess the current state and activity of the driver in order to decide whether he is able to take control. Also for non-autonomous cars with advanced active safety functions it may be helpful to have knowledge of the current activity and awareness of the driver, so that in the case where the driver is not aware of a critical situation arising, the car can adapt a warning strategy to prevent accidents or even critical situations. Accordingly, there is a need for efficient methods and devices for driver activity classification.

According to various embodiments, a method for recognizing the current activity of the driver, for example based on conventional (intensity) images and depth images of a time-of-flight (ToF) camera mounted inside the car, may be provided. The method may be based on time of flight image sequences (i.e. sequences of distance information), driver body keypoints and a trained artificial neural network to classify different actions of a driver.

Key parts of the driver's body may be localized, and relevant image regions may be evaluated in order to classify a number of behaviors and activities that drivers may typically perform while sitting in the car. Besides body movements, the most helpful information for recognizing the activity of a person may be found next to their hands, in particular in the somewhat restricted case of someone sitting in a car.

Figure 1:
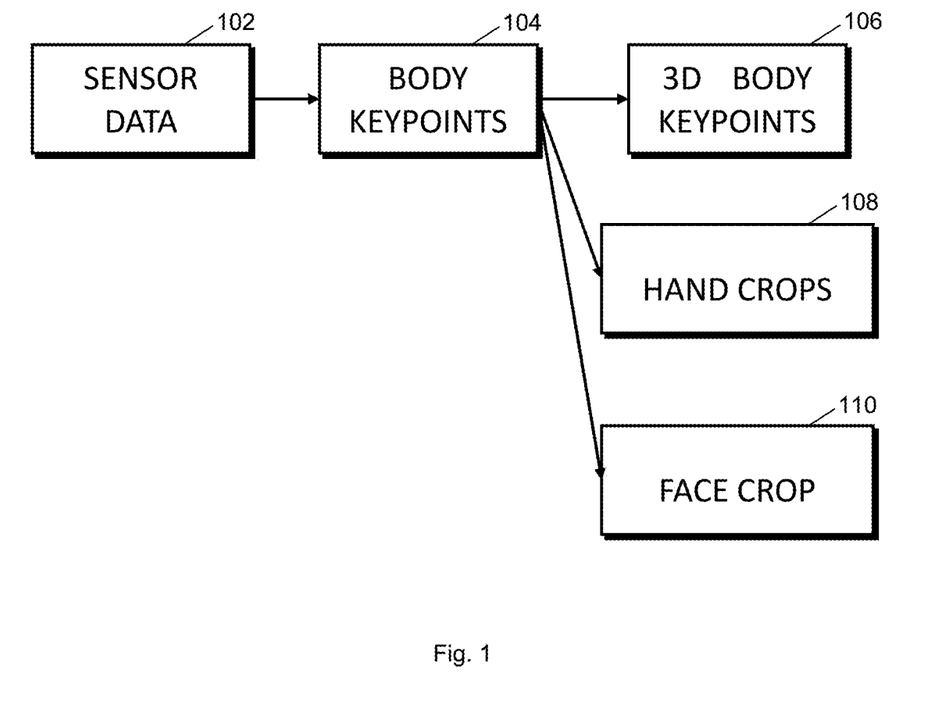
FIG. 1 an illustration of how input data to driver activity classification may be determined according to various embodiments.

FIG. 1 shows an illustration 100 of how input data to driver activity classification may be determined according to various embodiments. A sensor (or two or more sensors) may determine sensor data 102.

The sensor data 102 may include (grayscale) image sequences and corresponding depth information recorded by a time of flight camera. The time of flight camera provides grayscale images and depth information in a field of view (for example a field of view of 120°) covering the front seats of a car. These images and depth information may be cropped to contain only the driver side.

Body keypoints data 104 may be determined in the sensor data 102; in other words: data in the sensor data 102 which is related to the body keypoints may be determined; for example, the portion of the sensor data 102 which is related to the body keypoints (in other words: which represents a pre-determined region around the body keypoints) may be identified (and selected) in the sensor data 102.

For example, the following nine body keypoints may be used to model the driver's pose: left shoulder, right shoulder, left elbow, right elbow, left hand, right hand, left hip, right hip, left knee, and right knee.

Based on the body keypoints data 104, three-dimensional (3D) body keypoints 106 and/or hand crops 108 and/or a face crop 110 may be determined. The three-dimensional (3D) body keypoints 106 may include three-dimensional coordinates of positions of the respective body parts, for example in a coordinate system of the sensor, or in a coordinate system of the vehicle. The hand crops 108 may be portions of an image that include the left hand and/or the right hand of an occupant of the vehicle. The face crop 110 may be a portion of an image that includes the face of an occupant of the vehicle.

The locations of body keypoints (for example one or more hands, one or more elbows, one or more shoulders, one or more hip points, and/or one or more knees) may be considered, and only the most relevant image parts around those keypoints (for example the hand crops 108 and/or a face crop 110) and 3D body keypoints 106 may be used as input for the actual activity recognition system.

It has been found that focusing on the most relevant image parts may direct the attention of the (neural) network to image regions that are important for the action. Methods that are trained end-to-end without such additional knowledge would require significantly more training data. Furthermore using only the most relevant image parts helps to avoid overfitting to irrelevant image features, e.g. background features of the vehicle interior if, for example, certain actions have been recorded always with a specific car interior, and may help to reduce the computational complexity of the network, which may be critical for being able to run the system on an embedded platform within a car.

Figure 2:
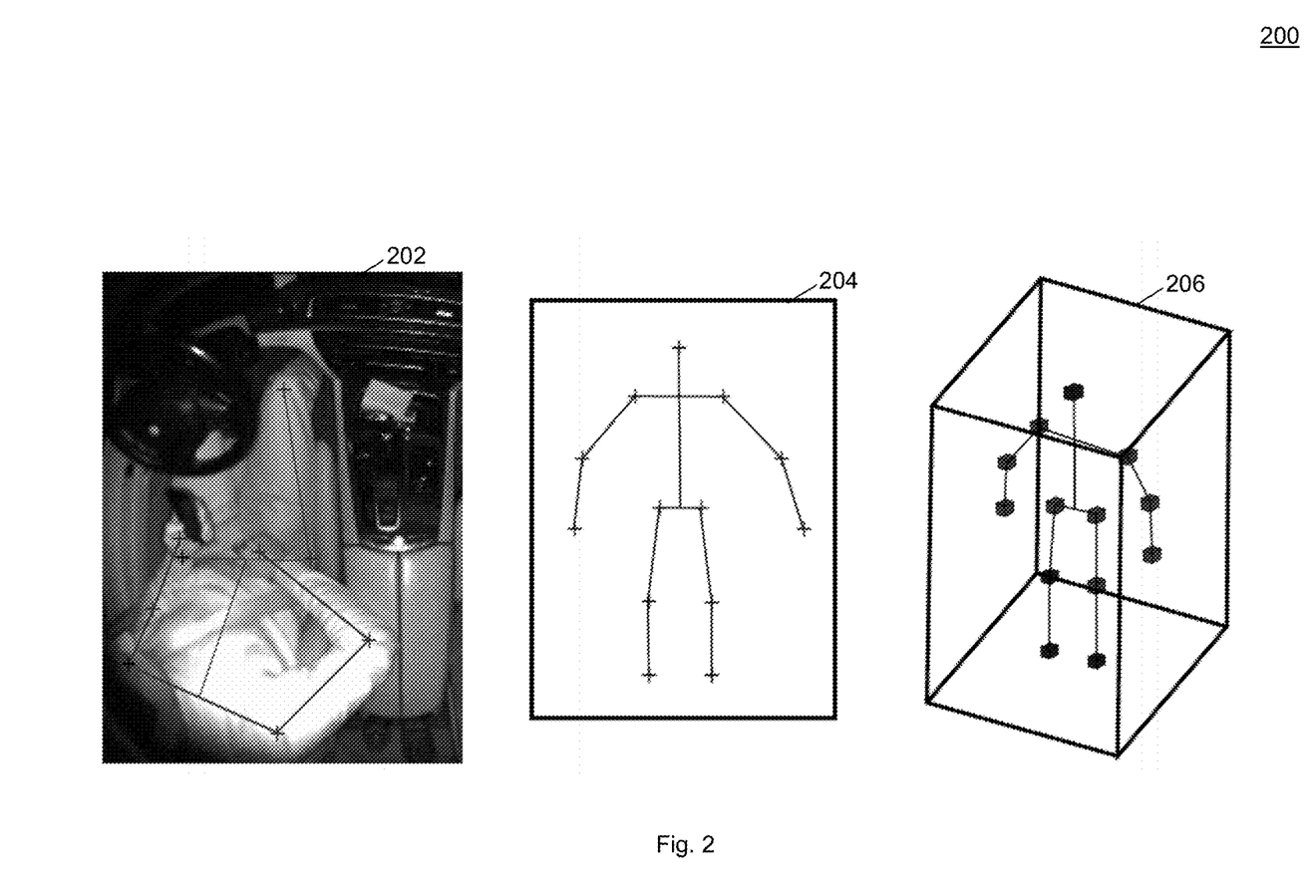
FIG. 2 an illustration of example body keypoints.

FIG. 2 shows an illustration 200 of example body keypoints. For example, a grayscale image 202 with lines indicating a skeleton, a full 2D skeleton 204, and a full 3D skeleton 206 are shown. Some of the keypoints may not be visible in the grayscale image 202 (for example the left shoulder and the left hip), and these keypoints may be estimated for further processing or may be neglected in further processing.

To calculate the body keypoints for each frame, a fully convolutional neural network may be trained on a data set as described in more detail below, on single depth frames (i.e. the keypoints and their corresponding confidences may be calculated for each frame independently). For each keypoint, the network outputs a heatmap indicating its location if the respective body part is visible. In the training phase, the ground truth heatmaps contain the values of a Gaussian distribution centered at the desired keypoint location if the body part is visible, and are completely black otherwise. Consequently, if the network localizes a body keypoint well, the returned heatmap has a strong and roughly Gaussian shaped spot at its location. If the body part was not recognized, the heatmap stays dark, and if it is detected in more than one locations there are several local maxima. To decide whether a keypoint was localized and should be used, a confidence value may be calculated based on the intensity of the heatmap region around the maximal value, and the weighted standard deviation with relation to that maximal point. If the intensity values around that maximum are high and the standard deviation is low, these results may be of high confidence. The 2D location of the keypoint may be calculated as the center of gravity of the heatmap values. To avoid distortion by faraway nonzero values, only the pixels near the point with the maximal value may be used for the determination of the center of gravity.

The 2D body keypoints may then be transformed into 3D camera coordinates using the depth image. For each 2D keypoint, the median depth value from a small window around it in the depth map may be used. Using the intrinsic parameters of the camera, the 3D position of the point may be calculated from its 2D coordinates and depth. Alternatively, if the keypoint has been localized in two or more 2D (or 3D) camera images, its 3D position can be calculated from these two or more 2D positions considering the geometric relationship of the cameras. The 3D coordinates, together with the confidence, serve as part of the input to the recurrent part of the action recognition network.

The most relevant parts of the scene (which may be the posture of the driver) may be described by the body keypoints, and may be used to determine image subregions (or crops) of interest, for example image subregions containing the driver's hands. For example, patches (or crops) of the (intensity) images where the hands are located may be used. To get these patches, an area around the calculated hand keypoints may be cropped out dynamically for each frame.

Figure 3:
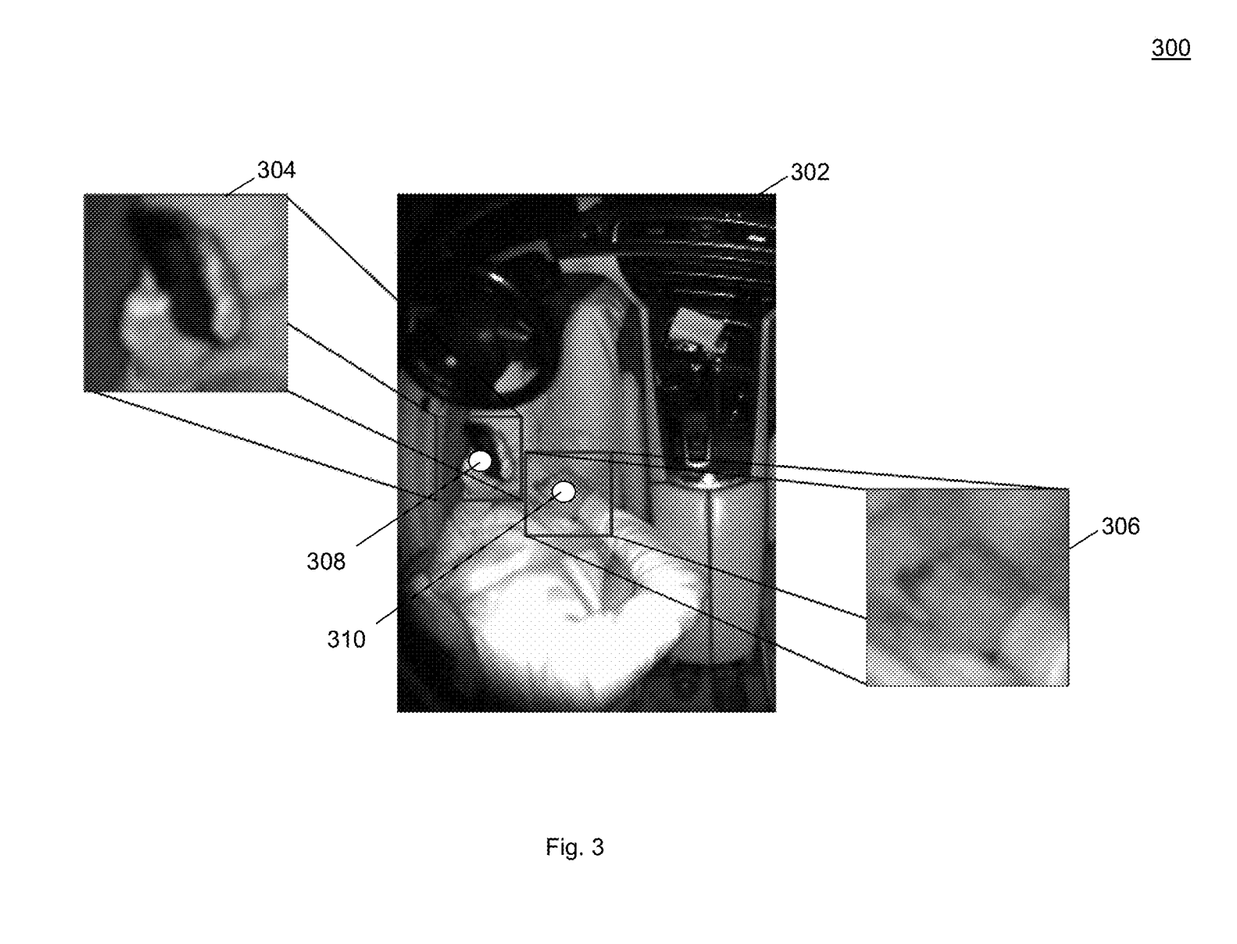
FIG. 3 an illustration of determining hand patches from an image with body keypoints according to various embodiments.

FIG. 3 shows an illustration 300 of determining hand patches (in other words: cropped regions 304, 306) from an (e.g., intensity, color, depth) image 302 with body keypoints according to various embodiments. Cropped regions 304, 306 around left and right hands of an occupant are shown. Circles 308, 310 illustrate the calculated hand locations, and the cropped regions 304, 306 are cropped around these hand locations.

The cropped regions 304, 306 may be of a pre-determined fixed size, or may be variable in size, for example depending on how big the hands are shown in the intensity image 302 and/or their distance to the camera.

The cropped regions 304, 306 (in other words: patches of the images where the hands are located) may be used as input to the neural network, like described in more detail below.

By combining the body posture with the most relevant image features (for example from near the hands), the driver's current activity may be recognized in an efficient way that is robust to background changes.

The activity information thus gained can for example be used to estimate the ability of the driver to react to emergency situations or take over control of a semi-autonomous car at any moment, and it may also be useful to configure e.g. entertainment systems, illumination or climate control.

It will be understood that even though the above example uses the hands as pre-determined body parts (and thus, the portion of the intensity image shows the hands), other parts of the body, for example the occupant's face, may be used.

Furthermore, it will be understood that even though according to the above example, the body keypoints and 3D body keypoints are determined based on the ToF camera, various other sensors may be used.

Figure 4:
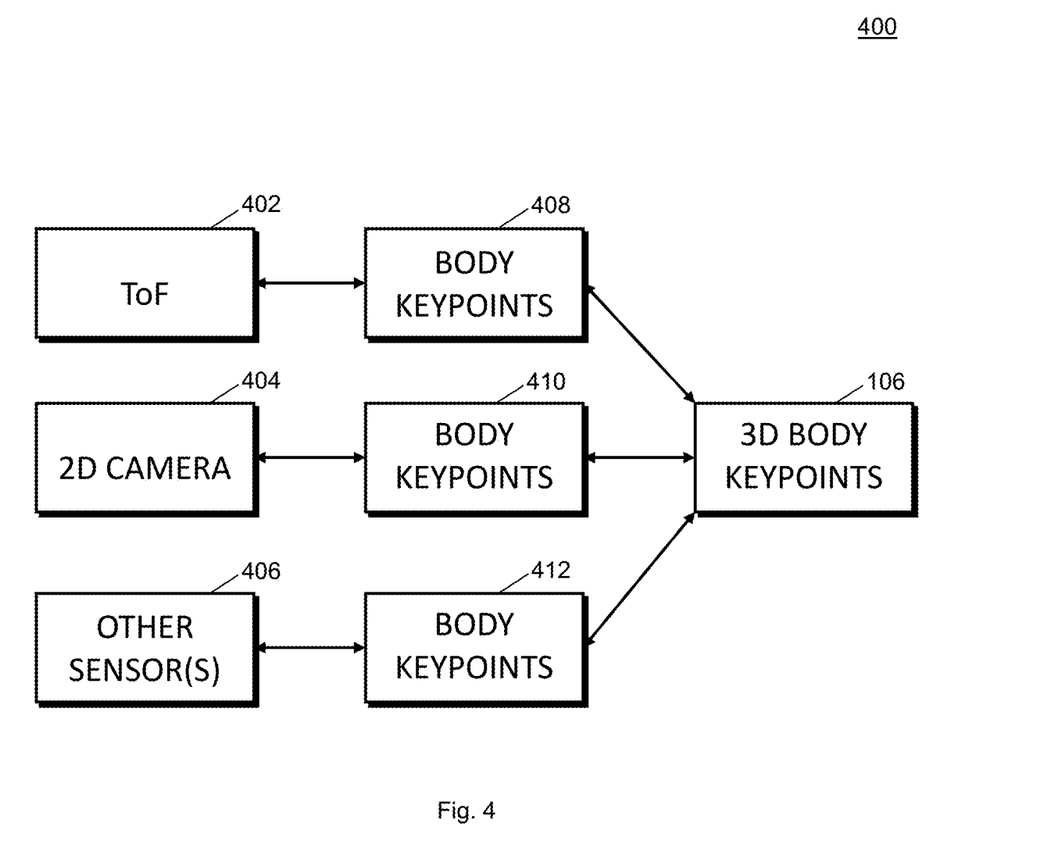
FIG. 4 an illustration of body keypoints data fusion according to various embodiments.

FIG. 4 shows an illustration 400 of body keypoints data fusion according to various embodiments. For example, a ToF system 402, a 2D camera 404, and one or more other sensors 406 may be provided. The ToF system 402 may be used to determine ToF related body keypoints 408. The 2D camera 404 may be used to determine 2D camera related body keypoints 410. The other sensor 406 may be used to determine other sensor related body keypoints 412. One or more of the ToF related body keypoints 408, the 2D camera related body keypoints 410, and the other sensor related body keypoints 412 may be used to determine the 3D body keypoints 106. Like illustrated in FIG. 4 by double-sided arrows, the 3D body keypoints 106 may also be used to determine one or more of the ToF related body keypoints 408, the 2D camera related body keypoints 410, and the other sensor related body keypoints 412 (i.e. the determination may be provided in a reverse direction). The respective keypoints may then be used to supplement or enhance the respective sensor data. For example, the ToF related body keypoints 408 may be used to enhance the sensor data provided by the ToF system 402, the 2D camera related body keypoints 410 may be used to enhance the sensor data provided by the 2D camera 404, and the other sensor related body keypoints 412 may be used to enhance the sensor data provided by the other sensor 406. The respective keypoints include portion of the respective data that shows (or includes or represents) the pre-determined portions of the body of the occupant. For example, the ToF related body keypoints 408 may be one or more portions of the data provided by the ToF system 402 which show (or include or capture) one or more of the pre-determined portions of the body of the occupant; the 2D camera related body keypoints 410 may be one or more portions of the data provided by the 2D camera 404 which show (or include or capture) one or more of the pre-determined portions of the body of the occupant; the other sensor related body keypoints 412 may be one or more portions of the data provided by the other sensor 406 which show (or include or capture) one or more of the pre-determined portions of the body of the occupant.

Figure 5:
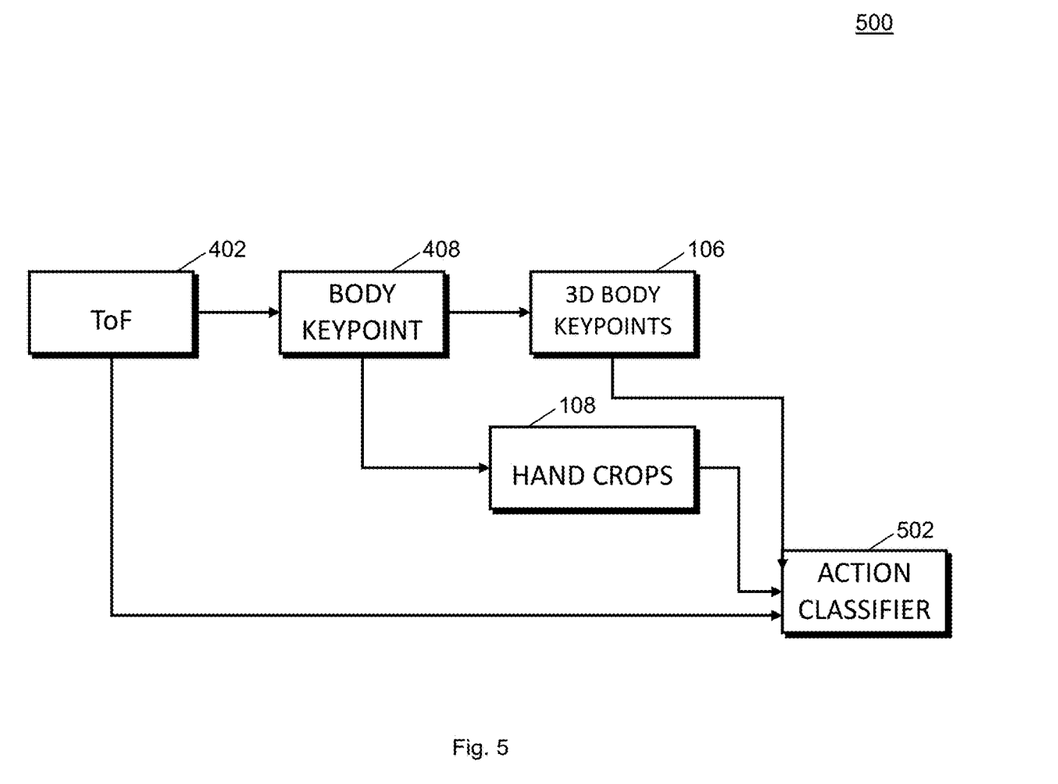
FIG. 5 an illustration of determining input data to an action classifier according to various embodiments.

FIG. 5 shows an illustration 500 of determining input data for an action classifier 502 according to various embodiments. The ToF system 402 may provide the ToF related body keypoints 408, which may be used for determining the 3D body keypoints 106 and the hand crops 108. The data provided by the ToF system 402, the hand crops 108, and the 3D body keypoints 106 may be provided as input to the action classifier 502.

Figure 6:
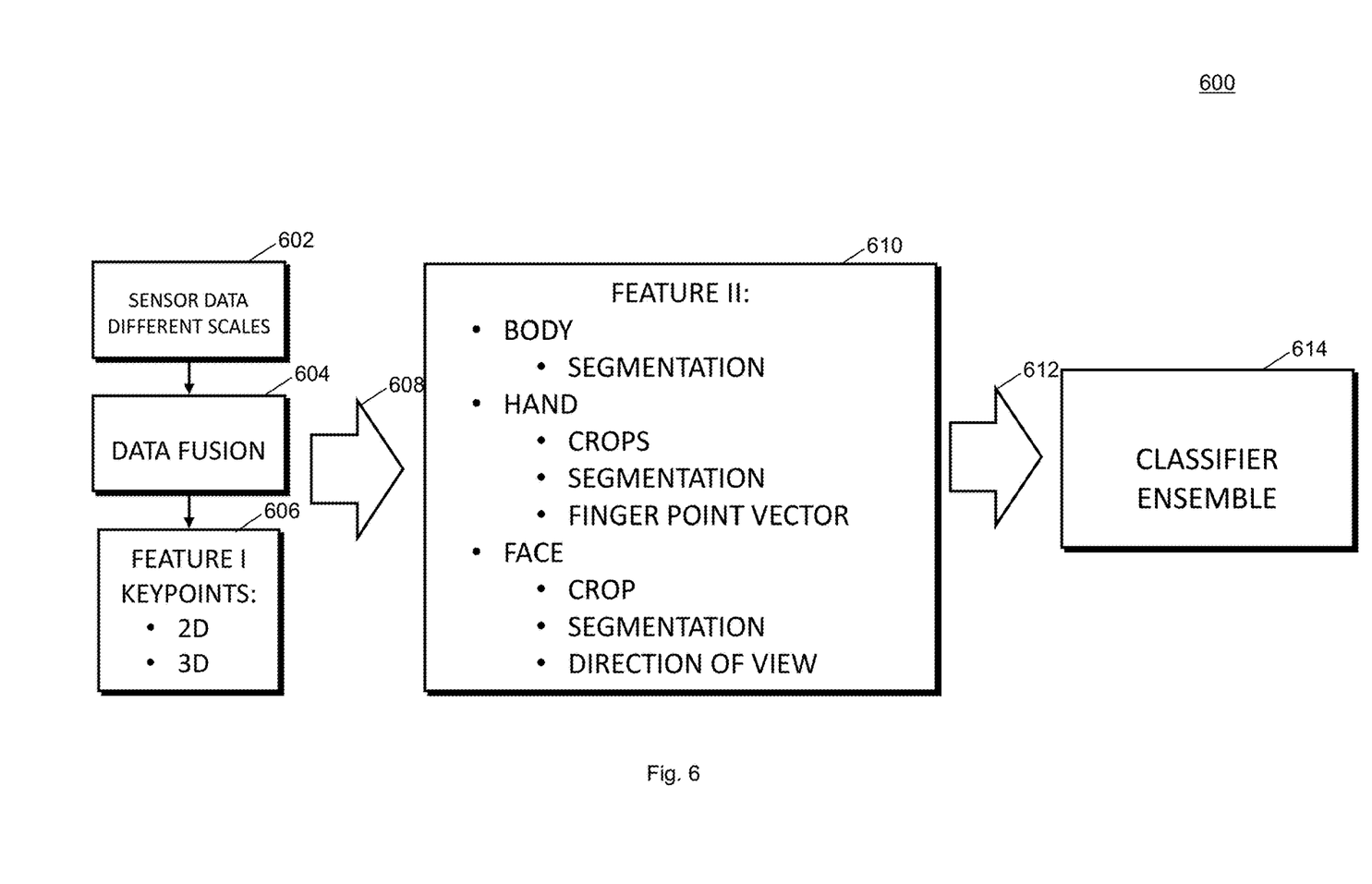
FIG. 6 an illustration of a classification system according to various embodiments.

FIG. 6 shows an illustration 600 of a classification system according to various embodiments. Sensor data 602 (for example on different scales, or from different sensors) may be provided to a data fusion module 604. The data fusion module 604 may carry out processing like described above with reference to FIG. 4. The results of data fusion may be a first set of features 606, which may for example include keypoints, for example 2D keypoints and/or 3D keypoints. The first set of features 606 may be used to determine a second set of features 610, like illustrated by arrow 608. The second set of features 610 may include features related to the occupant's body (for example a segmentation), related to the occupant's hands (for example crops, a segmentation, or a finger point vector, for example a vector indicating a location or direction to which the occupant points with one of his fingers), and/or related to the occupant's face (for example a crop, a segmentation, and/or a direction of view, for example a vector indicating a location or direction to which the occupant directs his face or to which he is looking). The second set of features 610 may be provided to a classifier ensemble 614 (in other words: a classifier or a classifier module), like indicated by arrow 612.

Figure 7:
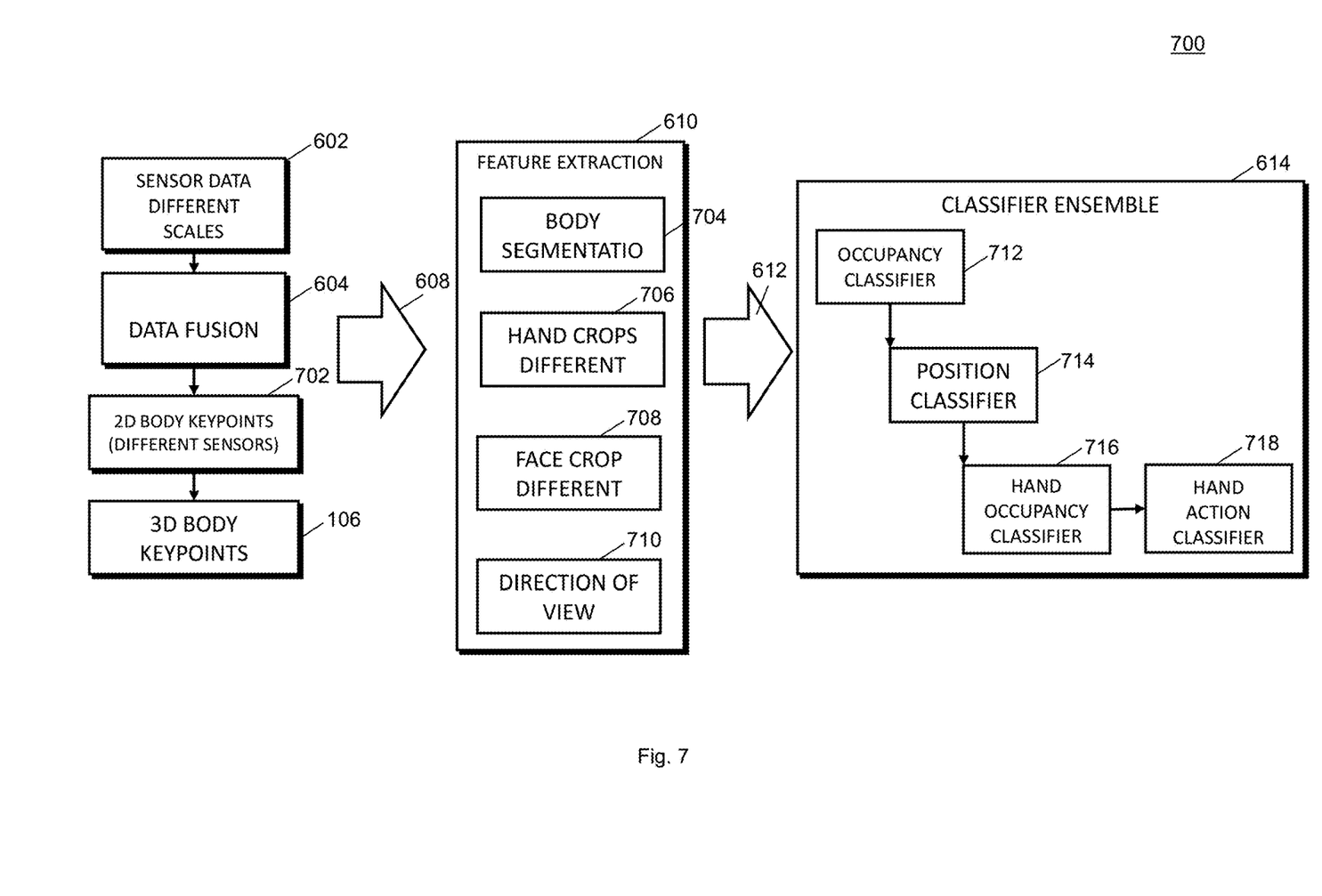
FIG. 7 an illustration of a classification system according to various embodiments.

FIG. 7 shows an illustration 700 of a classification system according to various embodiments. Various portions of the classification system illustrated in FIG. 7 may be similar or identical to portions of the classification system illustrated in FIG. 6, so that the same reference signs may be used and duplicate description may be omitted.

The first set of feature points may include 2D body keypoints 702, for example determined based on various different sensors, like described above with reference to FIG. 4. Based on these 2D body keypoints 702, the 3D body keypoints 106 may be determined.

The second set of features 610 may be based on feature extraction, and may for example include body segmentation 704, hand crops 706 of different scales, a face crop 708 of different scales, and/or a direction of view 710. The classifier ensemble 614 may include an occupancy classifier 712 configured to determine whether a seat is occupied by an occupant, a position classifier 714 configured to determine whether an occupant of a vehicle is in a driving position, a hand occupancy classifier 716 configured to determine whether the occupant's hands are occupied (for example by using a mobile phone), and a hand action classifier 718 configured to classify an action of the occupant. For example, the position classifier 714 (and subsequently the hand occupancy classifier 716, the hand action classifier 718) may only be used if it is determined by the occupancy classifier 712 that the seat is occupied. Likewise, the hand occupancy classifier 716 (and subsequently the hand action classifier 718) may only be used if it is determined by the position classifier 714 that the occupant is in a driving position. Likewise, the hand action classifier 718 may only be used if it is determined by the hand occupancy classifier 716 that the occupant's hands are occupied.

According to various embodiments, to classify the observed actions, a many-to-many CNN (convolutional neural network)-LSTM (long short-term memory) architecture (or generally any classifier that incorporates information from several timesteps, like a 3D convolutional network, a recurrent neural network or an LSTM) may be used. This means that a classification result is determined for each input example frame, also considering information obtained from the past input.

Figure 8:
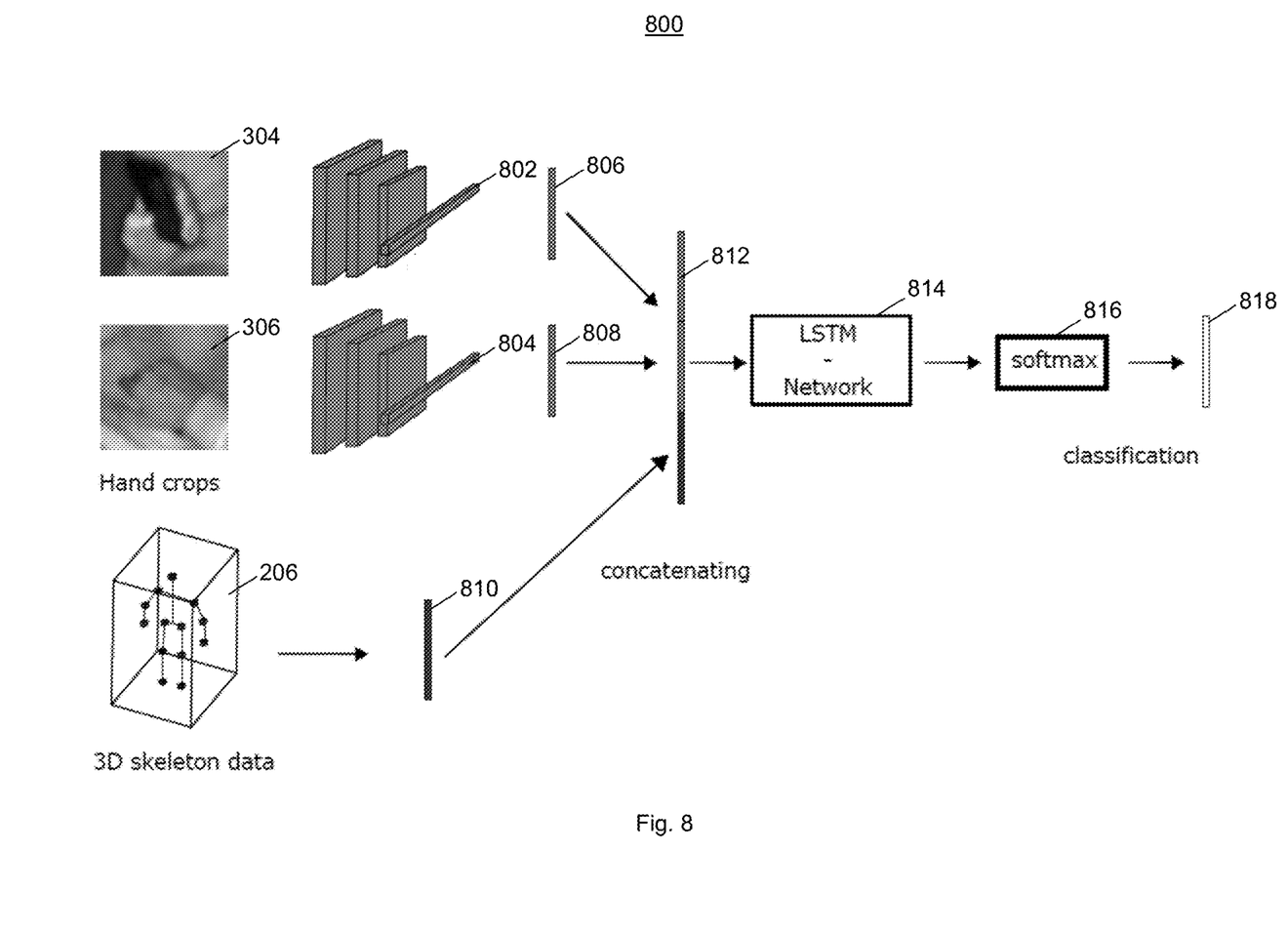
FIG. 8 an illustration of a classification system using hand crops and 3D skeleton data according to various embodiments.

FIG. 8 shows an illustration 800 of a classification system using the hand crops 304, 306 and the 3D skeleton data 206 according to various embodiments. The hand crops 304, 306 (in other words: sub images corresponding to the hand regions) may be fed into one or multiple convolutional neural networks (CNN) (for example, the hand crop 304 of the left hand may be fed into a first neural network 802, and the hand crop 306 of the right hand may be fed into a second neural network 804) to encode the image content to some embeddedings (feature vectors 806, 808, which may be learnt by the network, and which may have or may not have a meaning that can be interpreted by a human operator). The first neural network 802 and the second neural network 804 may be identical, for example trained identically, or different, for example networks with different structure, or networks with identical structure but trained differently, for example with different training data, or partially different (with some parts identical, and some parts different, for example with partially different structure, or with parts which are trained differently). The feature vectors 806, 808 from both the left hand and the right hand may be concatenated (or appended). Furthermore, based on the 3D body keypoints of the 3D skeleton data 206, 3D coordinates (and optionally the respective uncertainties) may be included in a further feature vector 810. The feature vectors 806, 808 and the further feature vector 810 may be appended to obtain a joined feature vector 812.

The joined feature vector 812, which represents the current time step, is fed into a temporal network structure, for example, an LSTM (long short-term memory) network 814 to consider temporal aspects of actions. It will be understood that even though an LSTM network 814 is illustrated in FIG. 8, any classifier that incorporates information from several timesteps, like a 3D convolutional network, a recurrent neural network, or an LSTM, may be used. The final output of the classification vector 818 may be generated in a classification step, for example using a softmax method 816. The classification vector 818 may be a probability vector, wherein each entry of the probability vector indicates a respective probability for each class of the plurality of classes of actions that the action falls into the respective class.

In various embodiments, datasets may be used which include sequences recorded with a time of flight camera. Each sequence contains an action performed by a person sitting in the driver seat of one of the test cars. The camera covers a field of view (for example 120°) of the front interior of different cars. The images have two channels, a grayscale channel (or intensity channel) and a depth channel. The following actions may be considered: no action, enter car, dismount car, strap seat belt, unstrap seat belt, smartphone: idle, smartphone: phone call, smartphone: interaction, bottle: idle, bottle: drinking, bottle: interaction. The data may be augmented with several augmentation techniques. For example, noise may be added to the body keypoints by randomly shifting the 2D positions within a fixed range. Due to this, the hand images are augmented automatically, as the hand positions move slightly each time the keypoints are shifted. Moreover, random noise may be added to the images.

Figure 9:
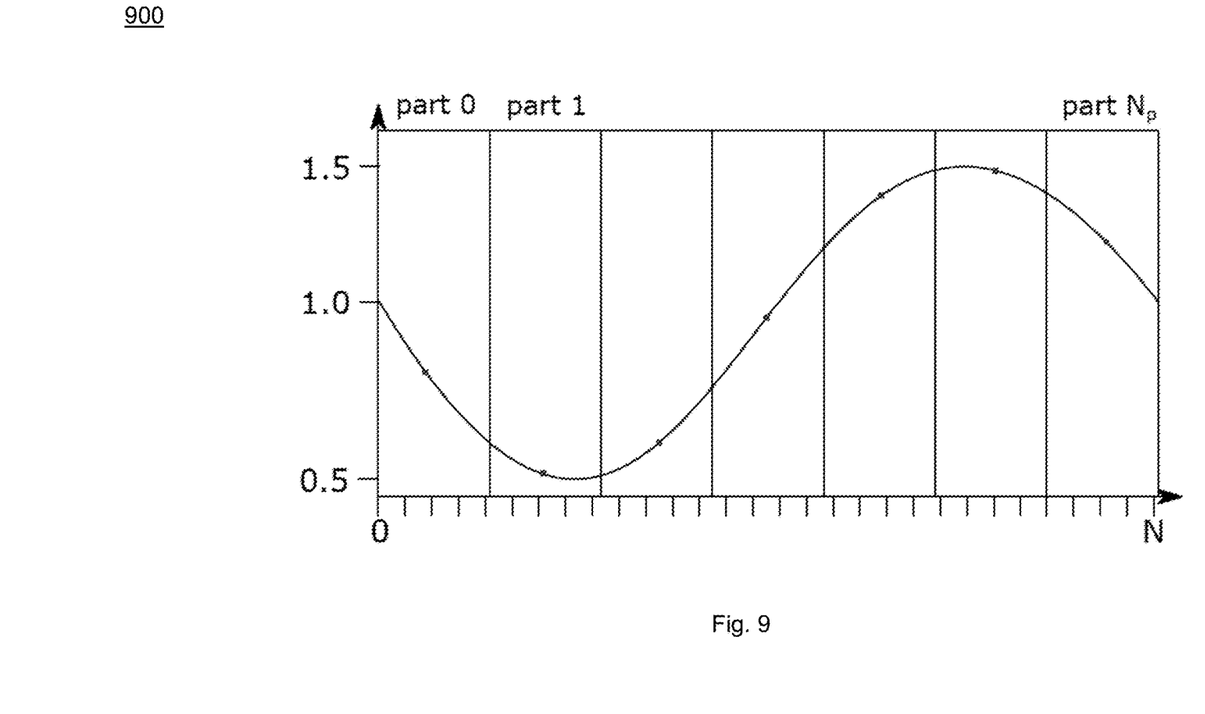
FIG. 9 an illustration of a sine wave.

To augment the temporal component of the data, a sine oscillation may be calculated, which describes the usage of frames in a sequence. The dilation and the phase angle of the sine wave are selected randomly in a predefined range. An amplitude of 0.5 and a bias of 1 may be assigned to the oscillation, to get values between 0.5 and 1.5. FIG. 9 shows an illustration 900 of such a sine wave. The sequence may be split in N parts and one value of the sine wave may be assigned to each part sequentially. These values are a factor which describes how many frames of a part are used. E.g. with a factor of 0.5, only half of the frames of this part would be used, which results in speeding up this part of the sequence by a factor of 2. In this way, the action sequence may be speeded up or slowed down randomly.

According to various embodiments, the overall system may include at least one camera (a 2D camera, in other words: intensity/grayscale or RGB (red-green-blue) or RGBIR (red-green-blue-infrared) or IR (infrared) or other camera, and/or a 3D camera, for example a ToF or stereo camera system), a processing unit, and an output unit that transmits output signals to at least one other processing unit.

According to various embodiments, methods and devices for action and object interaction recognition for driver activity classification may be provided. The temporal aspects of actions may be considered based on motion information and image sequences as input.

With the methods and systems for determining an activity of an occupant of a vehicle technology according to various embodiments, the following action recognition features and use cases could be realized (in other words: the activity of the occupant may be classified based on the following classes): detection of a person entering or leaving a car; detection of a person inserting or removing an object to or from a car, detection of a person inserting or removing a baby seat to or from a car, detection of a person inserting or removing a child/baby to or from a car, detection of a person buckling up a seat belt/unbuckling a seat belt, detection of a person interacting with a phone (for example distinguishing between holding a phone and active control, i.e. typing), detection of a person talking on a phone, detection of the driver interacting with some other object (e.g. book or magazine, laptop, tablet), detection of the driver interacting with the steering wheel, detection of person in the cabin smoking, detection of a person in the cabin eating or drinking, detection of a person in the car operating some infotainment or other vehicle controls (including touch screens, control knobs, buttons, . . . ).

For example information on whether a person in the car is operating some infotainment or other vehicle controls may be used to derive statistics on vehicle usage. The data may be uploaded and analyzed inside or outside the vehicle (e.g. cloud service), and such data may be used to improve user experience (for example related to which features are used frequently or which features are used rarely), and may help the OEMS (original equipment manufacturers) to modify HMI (human machine interface) concepts in future vehicles.

Although some of the embodiments are focused on the driver using a roof mounted ToF camera (with a top down view), other seats may be covered accordingly with alternative sensor positions (or a multi sensor configuration).

With the information obtained by the methods and systems for determining an activity of an occupant of a vehicle technology according to various embodiments, it may be possible to adjust the parameters of an ADAS (advanced driver-assistance systems) function or an automated driving system. Certain determined actions may lead to different warning strategies. At the same time, such information can be used to predict the response time of the driver to take back the control of the vehicle, if necessary.

The body keypoints may be used to determine a portion of the image which is informative (in other words: which includes information which may be used) for determining which kind of cloths the occupant is wearing.

Figure 10:
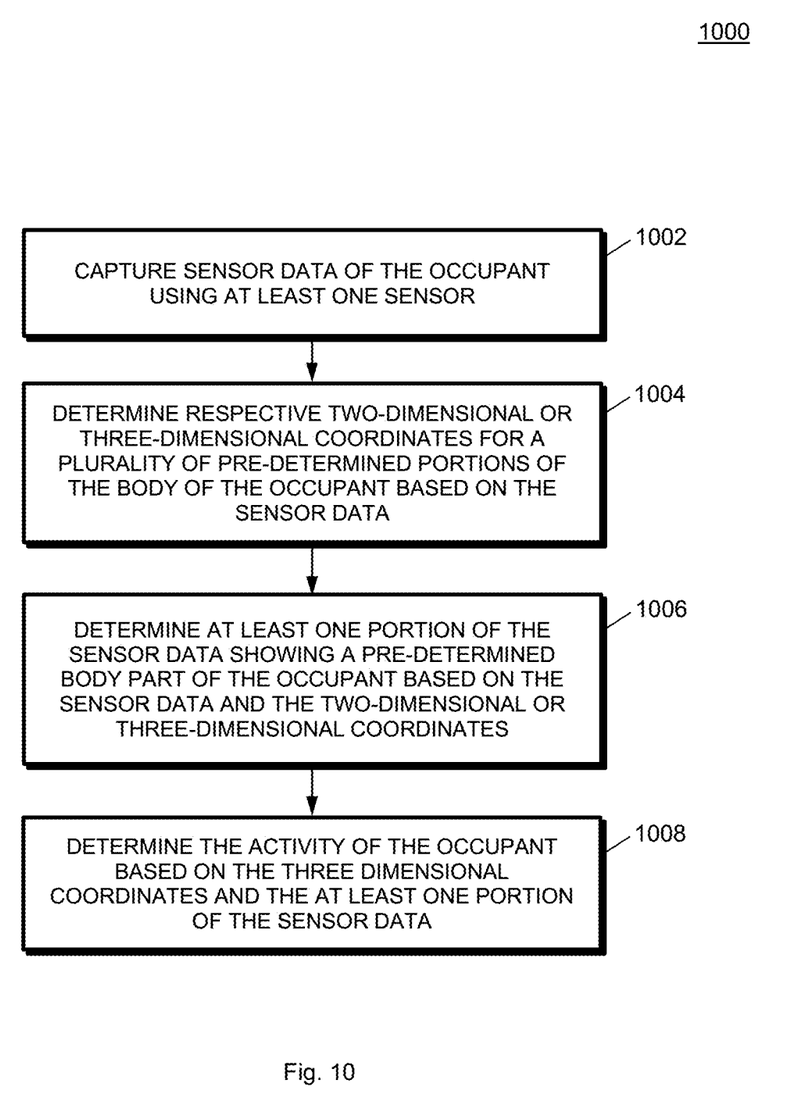
FIG. 10 a flow diagram illustrating a method for determining an activity of an occupant of a vehicle according to various embodiments.

FIG. 10 shows a flow diagram 1000 illustrating a method for determining an activity of an occupant of a vehicle according to various embodiments. At 1002, sensor data of the occupant may be captured using at least one sensor. At 1004, respective two-dimensional or three-dimensional coordinates may be determined for a plurality of pre-determined portions of the body of the occupant based on the sensor data. At 1006, at least one portion of the sensor data showing a pre-determined body part of the occupant may be determined based on the sensor data and the two-dimensional or three-dimensional coordinates. At 1008, the activity of the occupant may be determined based on the two-dimensional or three-dimensional coordinates and the at least one portion of the sensor data.

According to various embodiments, the sensor data may include or may be an image and further sensor data, and the at least one portion of the sensor data may include or may be at least one portion of the image.

According to various embodiments, the image may include a plurality of intensity pixels, each intensity pixel indicating an intensity of light of a pre-determined wavelength or wavelength range received at the respective intensity pixel, and the further sensor data may include a plurality of distance pixels, each distance pixel indicates a distance between the further sensor and an object corresponding to the respective distance pixel.

According to various embodiments, the pre-determined body part of the occupant may include one of the occupant's hands and/or the occupant's face and/or one of the occupant's shoulders.

According to various embodiments, the at least one portion of the image may be determined based on a neural network.

According to various embodiments, a plurality of images and a plurality of further sensor data may be captured, the two-dimensional or three-dimensional coordinates may be determined based on at least one of the plurality of images and the plurality of further sensor data.

According to various embodiments, the activity may be determined based on a softmax method.

According to various embodiments, determining the activity may include or may be classifying an action of a driver into one or more classes of a plurality of classes of actions.

According to various embodiments, classifying may include or may be determining a probability vector, wherein each entry of the probability vector indicates a respective probability for each class of the plurality of classes of actions.

According to various embodiments, the plurality of classes of actions may include or may be one or more of the following actions: entering a car; leaving a car; inserting an object to a car; removing an object from a car; inserting a baby seat to a car; removing a baby seat from a car; inserting a child to a car; removing a child from a car; inserting a baby to a car; removing a baby from a car, buckling up a seat belt; unbuckling a seat belt; interacting with a phone; holding a phone; active control of a phone; typing on a phone; talking on a phone; interacting with an object; interacting with a book; interacting with a magazine; interacting with a laptop; interacting with a tablet; interacting with the steering wheel; smoking; eating; drinking.

Each of the steps 1002, 1004, 1006, 1008 and the further steps described above may be performed by computer hardware components.

What is claimed is:

1. A method for determining an activity of an occupant of a vehicle, the method comprising:

capturing sensor data, including data from a camera sensor, of the occupant using at least one sensor;

determining respective two-dimensional or three-dimensional coordinates for a plurality of pre-determined portions of the body of the occupant based on the sensor data;

determining at least one portion of the sensor data showing a pre-determined body part of the occupant based on the sensor data and the two-dimensional or three-dimensional coordinates; and determining the activity of the occupant based on the two-dimensional or three-dimensional coordinates and the at least one portion of the sensor data by classifying the activity into one or more classes of actions using an artificial neural network trained to evaluate temporal aspects of actions.

2. The method of claim 1,
wherein the sensor data comprises an image and further sensor data;
wherein the at least one portion of the sensor data comprises at least one portion of the image.

3. The method of claim 2,
wherein the image comprises a plurality of intensity pixels, each intensity pixel indicating an intensity of light of a pre-determined wavelength or wavelength range received at the respective intensity pixel; and
wherein the further sensor data comprises a plurality of distance pixels, each distance pixel indicates a distance between the further sensor and an object corresponding to the respective distance pixel.

4. The method of claim 1,
wherein the pre-determined body part of the occupant comprises one of the occupant's hands or the occupant's face.

5. The method of claim 1,
wherein a plurality of images and a plurality of further sensor data are captured; and
wherein the two-dimensional or three-dimensional coordinates are determined based on at least one of the plurality of images and the plurality of further sensor data.

6. The method of claim 1,
wherein the activity is determined based on a softmax method.

7. The method of claim 1,
wherein classifying comprises determining a probability vector, wherein each entry of the probability vector indicates a respective probability for each class of the one or more classes of actions.

8. The method of claim 1,
wherein the one or more classes of actions comprises one or more of the following actions: entering a car; leaving a car; inserting an object to a car; removing an object from a car; inserting a baby seat to a car; removing a baby seat from a car; inserting a child to a car; removing a child from a car; inserting a baby to a car; removing a baby from a car, buckling a seat belt; unbuckling a seat belt; interacting with a phone; holding a phone; active control of a phone; typing on a phone; talking on a phone; interacting with an object; interacting with a book; interacting with a magazine; interacting with a laptop; interacting with a tablet; interacting with a steering wheel; smoking; eating; drinking; operating a vehicle infotainment system; operating vehicle controls.

9. The method of claim 1, wherein determining the activity of the occupant is performed by further:
inputting the two-dimensional or three-dimensional coordinates and the at least one portion of the sensor data into one or more other trained artificial neural networks;
receiving feature vectors from the one or more other trained artificial neural networks; and
inputting the feature vectors into the trained artificial neural network.

10. The method of claim 9, wherein the one or more other trained artificial neural networks comprise at least one of:
a convolutional neural network (CNN);
a recurrent neural network (RNN);
a three-dimensional convolutional network; or
a long short-term memory (LSTM).

11. The method of claim 9, wherein the one or more other trained artificial neural networks comprise a plurality of different types of artificial neural networks.

12. The method of claim 9, wherein each of the other trained artificial neural networks is trained using different training data.

13. The method of claim 9, wherein:
the one or more trained artificial neural networks comprise at least two other trained artificial neural networks; and
the method further comprises, prior to inputting the feature vectors into the trained artificial neural network, concatenating the feature vectors output from the at least two other trained artificial neural networks.

14. A system comprising computer hardware components configured to determine an activity of an occupant of a vehicle by:
capturing sensor data, including data from a camera sensor, of the occupant from at least one sensor of the vehicle;
determining respective two-dimensional or three-dimensional coordinates for a plurality of pre-determined portions of the body of the occupant based on the sensor data;
determining at least one portion of the sensor data showing a pre-determined body part of the occupant based on the sensor data and the two-dimensional or three-dimensional coordinates; and
determining the activity of the occupant based on the two-dimensional or three-dimensional coordinates and the at least one portion of the sensor data by classifying the activity into one or more classes of actions using an artificial neural network trained to evaluate temporal aspects of actions.

15. The system of claim 14, further comprising an image sensor and at least one further sensor.

16. The computer system of claim 15, wherein the at least one further sensor comprises a time of flight camera.

17. The computer system of any one of claim 15, wherein the image sensor and the at least one further sensor are a combined sensor.

18. The system of claim 14, wherein the computer hardware components are further configured to determine the activity of the occupant by:
inputting the two-dimensional or three-dimensional coordinates and the at least one portion of the sensor data into one or more other trained artificial neural networks; and
receiving feature vectors from the one or more other trained artificial neural networks; and
inputting the feature vectors into the trained artificial neural network.

19. A non-transitory computer readable medium comprising instructions that when executed, configure computer hardware components of a system to determine an activity of an occupant of a vehicle by:
capturing sensor data, including data from a camera sensor, of the occupant from at least one sensor of the vehicle;
determining respective two-dimensional or three-dimensional coordinates for a plurality of pre-determined portions of the body of the occupant based on the sensor data;
determining at least one portion of the sensor data showing a pre-determined body part of the occupant based on the sensor data and the two-dimensional or three-dimensional coordinates; and determining the activity of the occupant based on the two-dimensional or three-dimensional coordinates and the at least one portion of the sensor data by classifying the activity into one or more classes of actions using an artificial neural network trained to evaluate temporal aspects of actions.

20. The non-transitory computer readable medium of claim 19, wherein the instructions further configure the computer hardware components to determine the activity of the occupant by:

inputting the two-dimensional or three-dimensional coordinates and the at least one portion of the sensor data into one or more other trained artificial neural networks; and receiving feature vectors from the one or more other trained artificial neural networks; and inputting the feature vectors into the trained artificial neural network.

* * * * *